United States Patent
Nader (10) Patent No.: US 8,275,530 B2
(45) Date of Patent: Sep. 25, 2012

(54) APPARATUS AND METHOD FOR INCREASING TRANSMISSION LINE FLUID PRESSURE

(75) Inventor: Gregg A. Nader, Libertyville, IL (US)

(73) Assignee: Sonnax Industries, Inc., Bellows Falls, VT (US)

(*) Notice: Subject to any disclaimer, the term of this patent is extended or adjusted under 35 U.S.C. 154(b) by 235 days.

(21) Appl. No.: 12/886,062

(22) Filed: Sep. 20, 2010

(65) Prior Publication Data
US 2012/0072086 A1    Mar. 22, 2012

(51) Int. Cl.
*G06F 7/00* (2006.01)

(52) U.S. Cl. ............... 701/58; 701/51; 701/60; 701/103; 192/3.3

(58) Field of Classification Search ............ 701/51, 701/58, 60, 78, 86, 103, 112; 192/3.3
See application file for complete search history.

(56) References Cited

U.S. PATENT DOCUMENTS

| | | | |
|---|---|---|---|
| 4,365,473 A * | 12/1982 | Schexnayder et al. .......... 60/447 |
| 5,496,099 A * | 3/1996 | Resch .......................... 303/114.1 |
| 5,520,521 A * | 5/1996 | Benckert et al. .............. 417/280 |
| 6,022,293 A | 2/2000 | Dourra et al. |
| 6,056,094 A * | 5/2000 | Sakai ............................. 192/3.3 |

OTHER PUBLICATIONS

45RFE & 545RFE-HD2/Reprogramming Kit. TransGo 2006, pp. 1-6.

* cited by examiner

*Primary Examiner* — Gertrude Arthur Jeanglaude
(74) *Attorney, Agent, or Firm* — Downs Rachlin Martin PLLC (57) ABSTRACT

A transmission system that includes a transmission, a pressure sensor, a pressure booster, and a controller. The pressure booster being capable of raising the pressure of transmission fluid inside a closed-loop transmission by lowering the sensed pressure coming from the pressures sensor and being sent to the controller, thereby initiating a response from the controller that results in higher fluid pressures. The pressure booster does not lower the sensed pressure when the vehicle, and therefore, the transmission, is not in operation. Additionally, the pressure booster also does not increase the electric current through the electrical components of the fluid control system. The result is a transmission with a "firmer" feel between shifts and the correction of weak shifting problems such as gear slip.

33 Claims, 5 Drawing Sheets

APPARATUS AND METHOD FOR INCREASING TRANSMISSION LINE FLUID PRESSURE

FIELD OF THE INVENTION

The present invention generally relates to the field of transmissions. In particular, the present invention is directed to an apparatus and method for increasing transmission line fluid pressure.

BACKGROUND

Automobiles generally include three basic components for creating motive force: an engine, a powertrain, and wheels. The powertrain transmits torque generated by the engine, typically through either a manual or automatic transmission, to the wheels, thereby providing movement of the vehicle. In general, automatic transmissions include a torque converter that transfers engine torque from the engine crankshaft to the transmission input shaft. The transmission input shaft couples to one or more planetary gear sets, through frictional elements or clutch assemblies, to provide various amounts of torque to the transmission output shaft. The transmission output shaft typically powers a differential that drives the wheels.

Automatic transmissions generally use a fluid control assembly, which includes valves, accumulators, and a fluid pump, to engage the frictional elements and thereby transition from one gear to the next. In general, the fluid pressure must be carefully managed such that sufficient fluid line pressure is provided to engage and prevent slip between the frictional elements. If insufficient line pressure is provided, the frictional elements do not fully engage and slip occurs resulting in power loss and damage to the transmission. On the other hand, if excessive line pressure exists, the fluid pump torque may be higher than necessary, thereby resulting in poor fuel efficiency.

In some instances, however, it may be desirous to provide a different fluid pressure than that specified in the original equipment manufacturer (OEM) set-up. The shift "feel" or "firmness" of shifting between gears is largely dictated by the pressure of the fluid in the transmission. For example, if the fluid is provided at a higher pressure the result is a "firm" or hard shift between gears, while fluid at a lower pressure will produce a "softer" shift. In many types of transmissions, the ability to increase or decrease the fluid pressure is as simple as replacing a spring or a valve in the fluid control assembly. However, for some transmission systems, known as "closed loop" systems, an integrated controller will automatically correct the pressure to a predetermined value if one of the aforementioned techniques is employed. Thus, for some automotive enthusiasts, obtaining the perfect shifting feel without damaging transmission components has heretofore been out of reach.

SUMMARY OF THE DISCLOSURE

One aspect of the present invention is an apparatus for increasing the fluid pressure in a closed-loop transmission system having a pressure sensor, a controller, and a valve, the pressure sensor being in fluid communication with a pressurized fluid residing inside the transmission system and generating a first signal indicative of the fluid pressure, and the controller being in communication with the pressure sensor and the valve, wherein the controller receives the first signal and generates a second signal for controlling the valve based upon the first signal, the apparatus comprising: a housing coupleable between the pressure sensor and the controller; and a resistor disposed within the housing and having a resistance value of between 100 and 1000 Ohms, the resistor being in electrical communication between the pressure sensor and controller when the housing is coupled therebetween; wherein when the housing is coupled between the pressure sensor and the controller, the resistor alters the first signal to yield a third signal having a value based on the first signal, the third signal being transmitted to the controller in lieu of the first signal such that the second signal is generated based on the third signal.

Another aspect of the present invention is an apparatus for increasing the fluid pressure within a transmission assembly, the transmission assembly including a transmission, a pressure sensor, and a controller, the pressure sensor in fluid communication with the transmission to sense pressure therein and deliver a signal indicative of sensed pressure to the controller, the apparatus consisting essentially of: a first part configured and dimensioned to be electrically coupled to the pressure sensor; a second part configured and dimensioned to be electrically coupled to the controller; a plurality of conductors communicating between the first part and the second part; and a voltage modifier having a resistance of at least 100 ohms disposed in series with only one of the plurality of conductors.

Yet another aspect of the present invention is a method for increasing the pressure of transmission fluid in a transmission, the method comprising: measuring a first pressure of transmission fluid in the transmission; generating a first signal indicative of the pressure; modifying the first signal to a second signal indicative of a second pressure that is less than the first pressure when the transmission is in use by a vehicle; and increasing the first pressure based upon the second signal.

Another aspect of the present invention is a transmission system installed in a vehicle, the transmission system comprising: a transmission; a pressure sensor in communication with a pressurized fluid residing inside the transmission and generating a first signal indicative of a first pressure of the pressurized fluid in the transmission; a pressure booster coupled to the pressure sensor and generating a second signal indicative of a second pressure from the first signal, wherein the second signal, when the transmission is in use by the vehicle, is less than the first signal, and wherein the second signal, when the vehicle is not being operated, is about the same as the first signal; and a controller in electronic communication with the pressure booster for receiving the second signal.

In another aspect of the present invention is a pressure booster for electronically increasing the fluid pressure in a transmission system, the transmission system including a pressure sensor configured to generate a first signal indicative of an actual pressure within the system, a controller configured to receive the first signal and generate a second, control signal based thereon, and a valve configured to control fluid pressure in the system based upon the second, control signal received from the controller, the pressure booster comprising: at least one member configured and dimensioned to be electronically coupled between the pressure sensor and the controller: a plurality of conductors disposed within the at least one member, each the conductor providing electrical communication between corresponding conductors of the pressure sensor and controller; and a resistor disposed in series with one of the conductors, the resistor having a resistance sufficient modify the first signal received by the controller to be indicative of a pressure lower than actual pressure such that the controller generates a second, control signal indicative of a higher pressure requirement.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Generally, a transmission system 100, in accordance with certain embodiments of the present invention, is capable of raising the pressure of transmission fluid inside a transmission by lowering the sensed pressure being sent to a controller and thereby initiating a response from the controller that results in higher fluid pressures. In an exemplary embodiment, transmission system 100 does not lower the sensed pressure when the vehicle, and therefore, the transmission, is not in operation. Preferably, transmission system 100 also does not increase the electric current through the electrical components of the fluid control system. The result is a transmission with a "firmer" feel between shifts and the correction of weak shifting problems such as gear slip.

Figure 1:
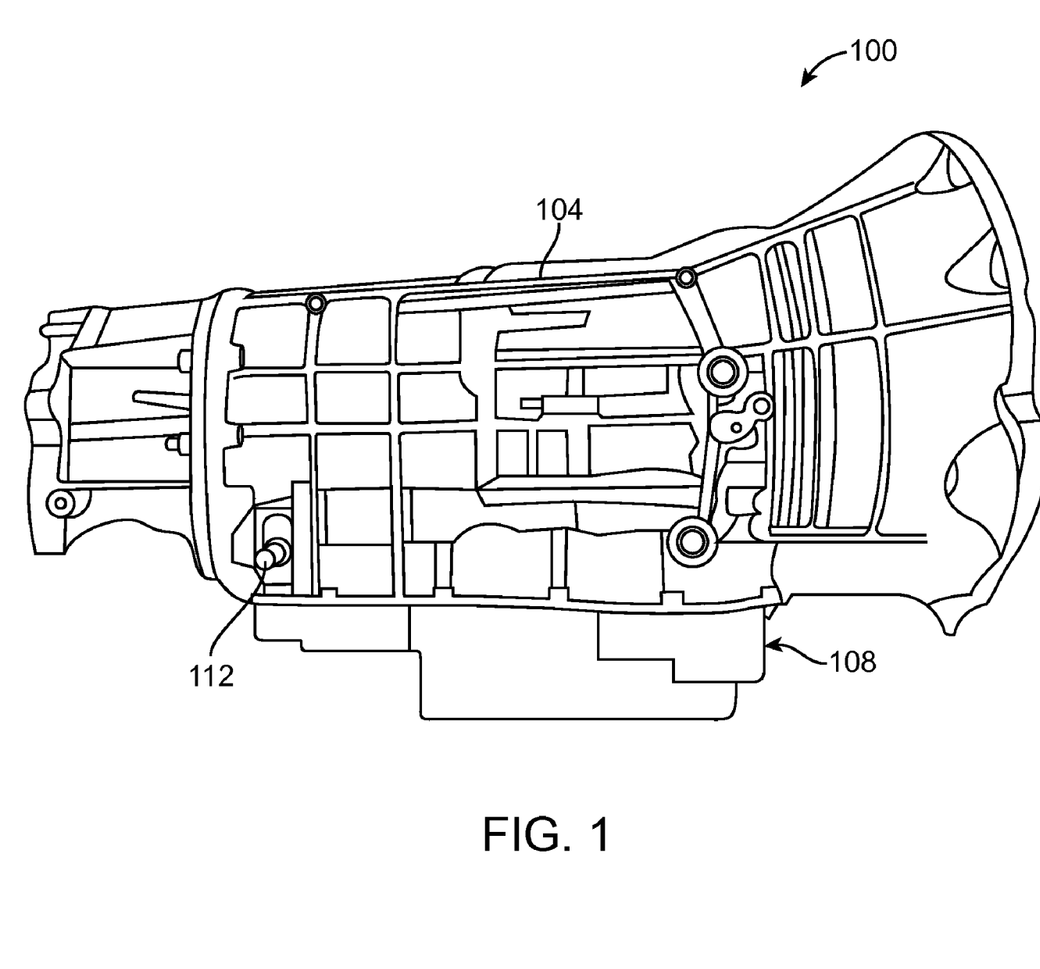
FIG. 1 is a perspective view of an automobile transmission system according to an embodiment of the present invention.

Turning now to the drawings, FIG. 1 shows transmission system 100. At a high level, transmission system 100 includes, among other things, a transmission 104 and a fluid control system 108, which includes pressure sensor 112. Transmission 104 contains various clutches, frictional elements, and gears, (not shown) which, as understood by a person of ordinary skill in the art, allow the transmission to transfer the energy created by the engine into a force to drive the wheels. Additionally, and as mentioned previously, the transition between gears is aided by the use of fluid control system 108 in conjunction with a pressurized fluid.

Figure 2:
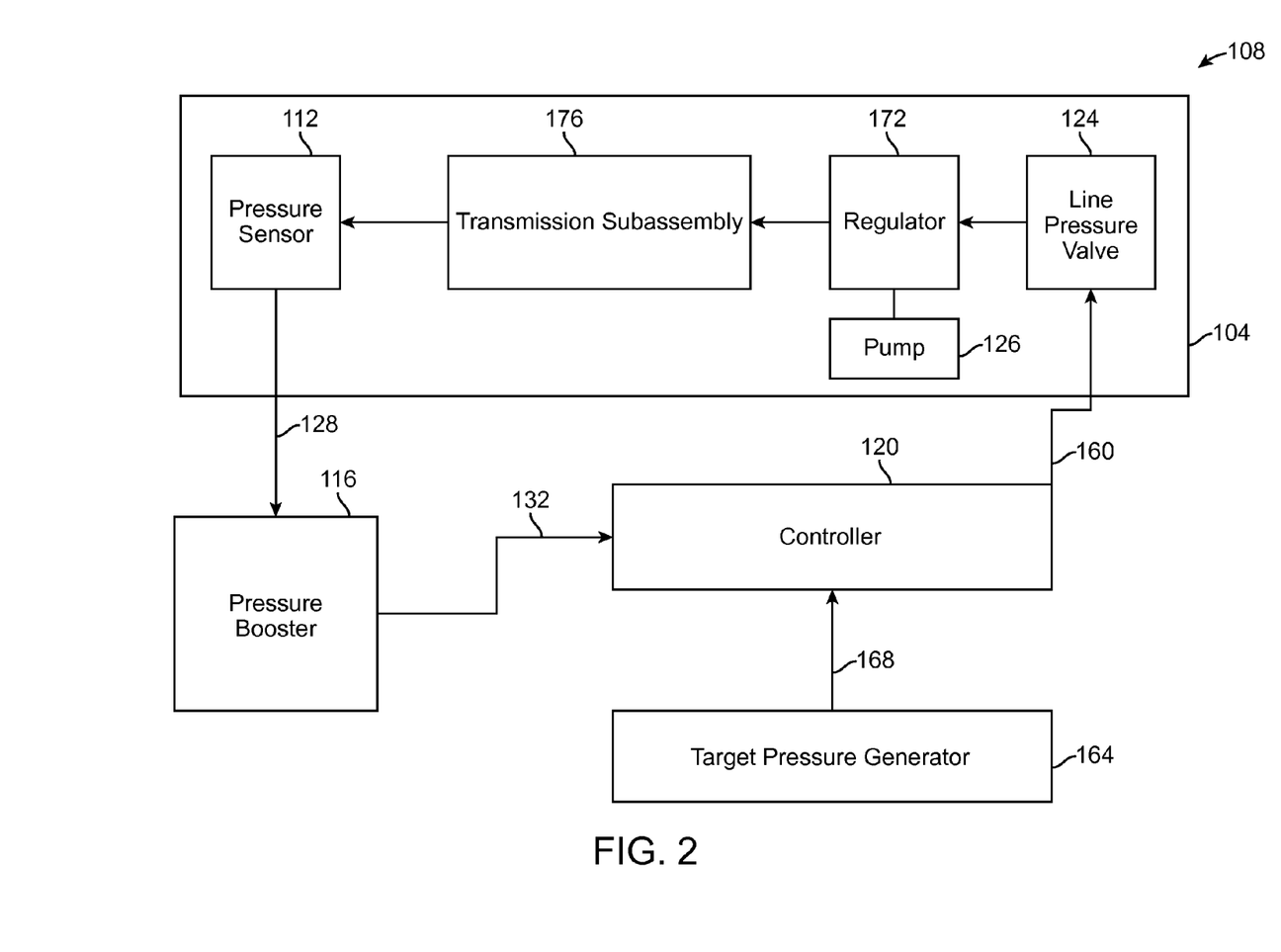
FIG. 2 is a block diagram of the components of an automobile transmission according to an embodiment of the present invention.

FIG. 2 shows a block diagram of an exemplary embodiment of a fluid control system 108, which may be a closed loop system. Fluid control system 108 controls the pressure of fluid in transmission 104 and includes, among other things, pressure sensor 112, a pressure booster 116, a controller 120, a line pressure control valve 124, and a pump 126. At a high level, fluid control system 108 relies on pressure sensor 112 to generate a signal 128 indicative of an actual pressure within the transmission system 108. Signal 128 is transmitted to pressure booster 116, which, as described further below, modifies the signal and transmits a modified signal 132 to controller 120. Controller 120, upon receipt of the modified signal, calculates, based upon a pre-programmed algorithm, the appropriate level of fluid pressure so that the fluid pressure is sufficient for the speed and torque generated by the vehicle engine.

Pressure sensor 112, which may also be referred to as pressure transducer by those of ordinary skill in the art, may take on many known forms such as strain-gage, capacitive, electromagnetic, piezoelectric, optical, potentiometric, resonant, thermal, etc. Regardless of the type of pressure sensor 112 employed in transmission system 100, the pressure sensor is capable of producing an output signal based upon the actual pressure of fluid inside transmission 104. In an exemplary embodiment, the output from pressure sensor 112 is voltage signal ranging from 0.5 volts to 5 volts.

Figure 3:
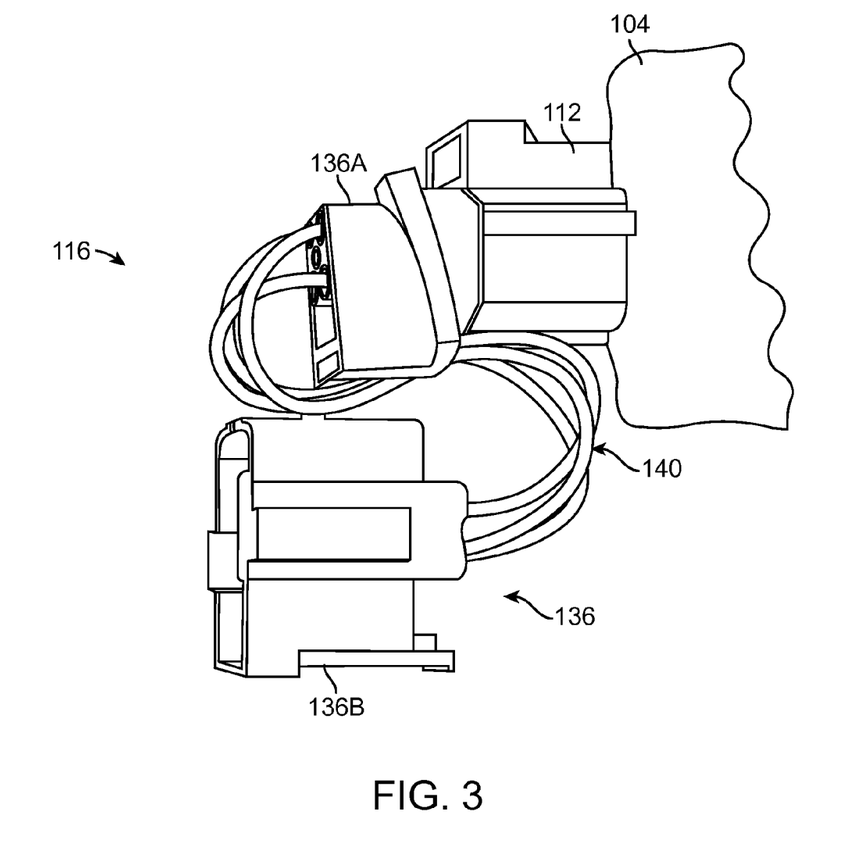
FIG. 3 is a partial perspective view of a pressure booster mounted to a pressure sensor and transmission according to an embodiment of the present invention.
Figure 3A:
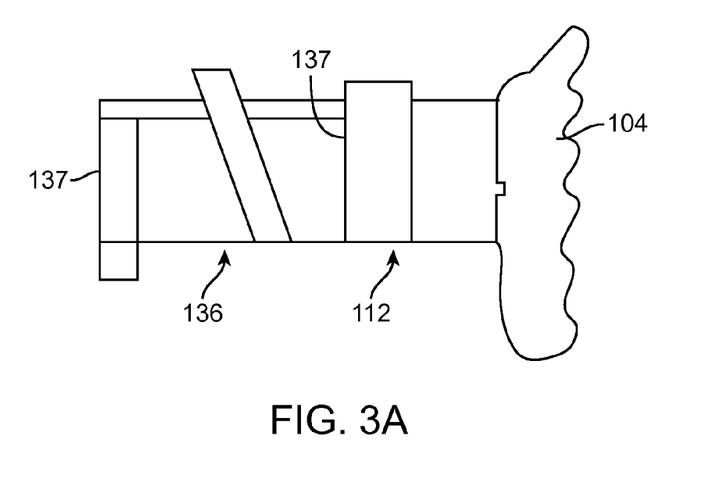
FIG. 3A is a side view of an alternative embodiment of the presented invention.
Figure 4:
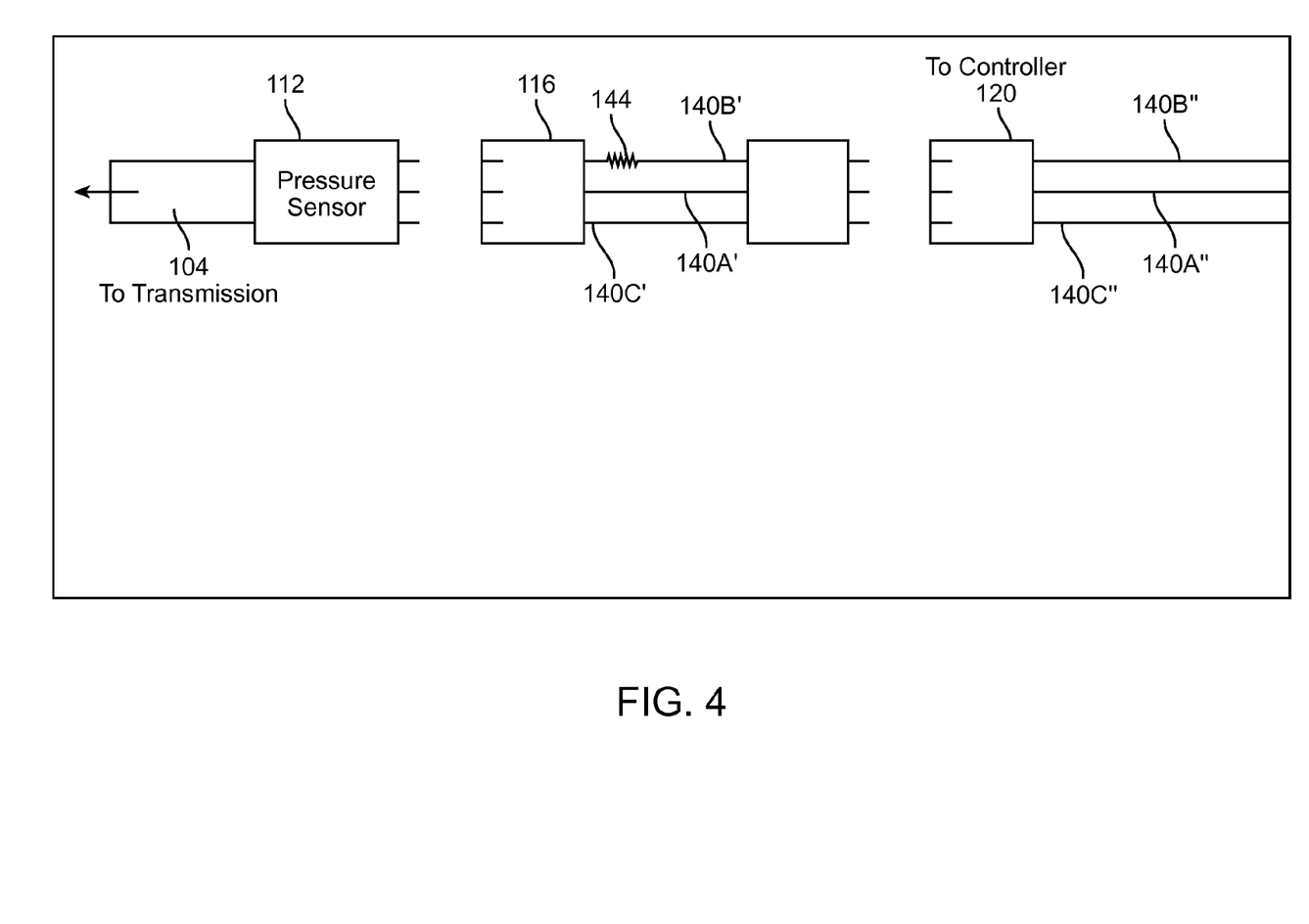
FIG. 4 is an electrical schematic of a pressure booster according to an embodiment of the present invention.

Pressure booster 116 is disposed between pressure sensor 112 and controller 120 and modifies signal 128, generated by the pressure sensor, to create a modified signal 132 received by the controller. As shown in FIG. 3, pressure booster may include a housing 136, a plurality of conductors 140, and a resistor 144 (FIG. 4). In an exemplary embodiment, housing 136 is configured in two portions, with a first housing portion 136A, releasably coupled to pressure sensor 112 and a second housing portion 136B to releasably couple to controller 120. In this embodiment conductors 140 connect the two portions. Housing portions 136A and 136B thus may be formed as electrical connectors configured to mate with corresponding connectors. Housing 136 facilitates installation and maintenance of pressure booster 116 because the pressure booster can be easily decoupled from pressure sensor 112 and controller 120. In an alternative embodiment, as illustrated in FIG. 3A, housing 136 may be configured as a unitary structure with adaptive ends 137 for mounting to pressure sensor 112 and controller 120, respectively. In this alternative embodiment, conductors 140 would be internally disposed in housing 136.

In certain embodiments, conductors 140 are wires that connect first housing portion 136A to second housing portion 136B (FIG. 3). In operation, typically, although not necessarily, each of the conductors carries a different voltage. For example, and as shown in FIG. 4, there are three conductors 140A'-C' included between first housing portion 136A and second housing portion 136B. Each of conductors 140A'-C' carries a different voltage, which in this embodiment can include, a ground wire 140A', a variable voltage wire 140W, and a high voltage wire 140C' (FIG. 4). Another set of conductors 140A"-C", which correspond respectively to conductors 140A'-C', transmit their voltages to controller 120.

As shown in FIG. 4, conductors 140 also provide a location for the mounting of resistor 144. Generally, resistor 144 is a two-terminal electronic component that produces a voltage across its terminals that is proportional to the electric current passing through it. In exemplary embodiments of the present invention, resister 144 decreases voltage signal 128 to produce modified signal 132, which is then sent to controller 120. Typically, in order to accomplish this voltage reduction, resistor 144 is electronically coupled in series with the high voltage wire coming from pressure sensor 112, such as high voltage wire 140C'. Resistor 144 may be composed of many materials known by those of ordinary skill in the art. In an exemplary embodiment, resistor 144 is an electronic component with a resistance of greater than 100 Ohms but less than 1000 Ohms. In another embodiment, resistor 144 is an electronic component with a resistance of greater than 200 Ohms but less than 500 Ohms.

Returning again to FIG. 2, controller 120 receives as an input, modified signal 132, and generates pressure signal 160 for line pressure control valve 124. A pre-determined algorithm, typically stored in controller memory, includes a target generator 164, which generates a target pressure signal 168 indicative of a desired pressure for the transmission hydraulic system. Target pressure signal 168 changes depending on the specific operating parameters of the vehicle. Thus, target pressure signal 168 is based on various operational inputs such as engine speed, turbine speed, output speed, throttle, MAP, etc. For a more detailed description of the generation of target pressure signal 168, reference is made to U.S. Pat. No. 5,458,545, entitled "Adaptive Line Pressure Control for an Electronic Automatic Transmission" to and U.S. Pat. No. 4,875,391, entitled "An Electronically Controlled, Adaptive Automatic Transmission System," each of which are incorporated by reference herein in their entirety.

When target pressure signal 168 is received by controller 120, the controller compares target pressure signal 168 to the modified voltage signal as provided by pressure booster 116. A difference between the two signals is determined by the controller. Based upon this difference, the controller 120 varies the cycle timing of line pressure valve 124 which varies the fluid flow and pressure through a regulator 172 from the pump 108 to a transmissions subassembly 176, which comprises the clutches, bands, and valves located within transmission 104. As such, the pressure within transmission system 100 is altered.

In an exemplary embodiment, the difference between voltage signal 128 and modified voltage signal 132, when transmission 104 is being operated, increases as a function of the voltage signal with the difference resulting in a pressure increase in transmission 104 of between 10 to 30 psi depending on the resistance value of resistor 144. In another embodiment, resistor 144 having a resistance of between 150 and 250 Ohms, preferably about 200 Ohms, changes the pressure in transmission 104 by about 10 to 15 psi when transmission 104 is in operation. In yet another embodiment, resistor 144 having a resistance of between 300 and 500 Ohms, preferably about 390 Ohms, changes the pressure in transmission 104 by about 20 to 30 psi when transmission 104 is in operation. As would be readily understood by those of ordinary skill in the art, resistor 144 may have a higher or lower resistance value depending on the desired fluid pressure increase in transmission 104.

Figure 5:
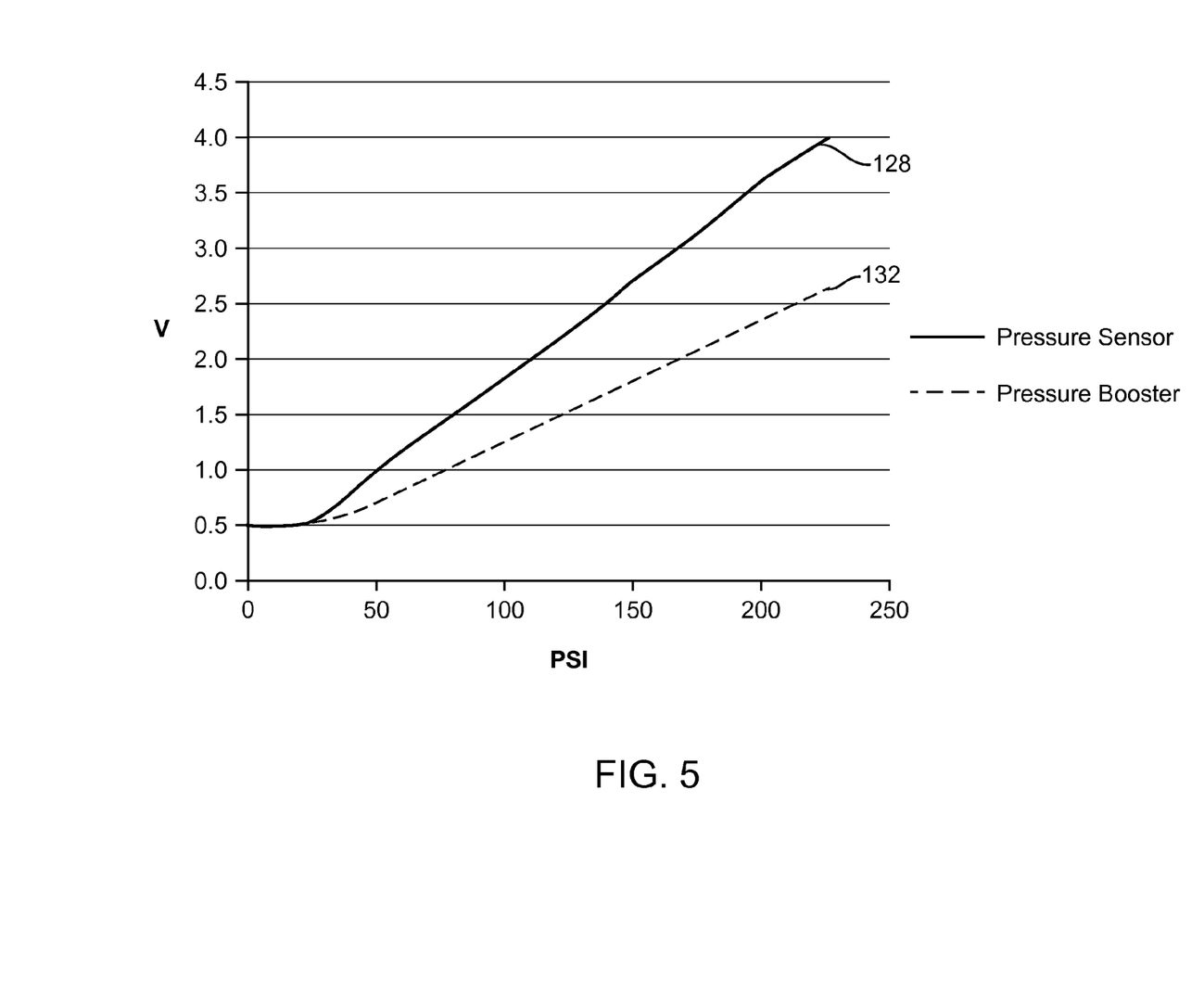
FIG. 5 is a chart comparing the output voltage signals of a pressure sensor and a pressure booster according to an embodiment of the present invention.

In the exemplary embodiment of transmission system 100 described above, pressure booster 116 is configured such that when signal 128, which in this embodiment is a voltage signal, is at a minimum, modified signal 132, which is also a voltage signal in this embodiment, is about equal to the signal. For example, and as shown in FIG. 5, when the vehicle, and hence transmission system 100, are not in operation ("key on position, with vehicle engine off"), signal 128 is at a minimum. Correspondingly, modified signal 132 is also at a minimum, a minimum that is about equal to signal 128. When transmission system 100 is in operation, fluid pressure begins to build in transmission 104. In this example, as signal 128 increases, modified signal 132 also increases; however, the modified signal increases at a slower rate than the signal. Although FIG. 5 only shows increases in signal 128 and modified signal 132, it is understood that pressure sensor 112 continuously sends an updated signal 128 to pressure booster 116, which may be lower or higher than the previously sent signal depending upon the operation of transmission 104. Understandably, modified signal 132 will also vary either higher or lower as a function of voltage signal 128.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for increasing the fluid pressure in a closed-loop transmission system having a pressure sensor, a controller, and a valve, the pressure sensor being in fluid communication with a pressurized fluid residing inside the transmission system and generating a first signal indicative of the fluid pressure, and the controller being in communication with the pressure sensor and the valve, wherein the controller receives the first signal and generates a second signal for controlling the valve based upon the first signal, the apparatus comprising:
    a housing coupleable between the pressure sensor and the controller; and
    a resistor disposed within the housing and having a resistance value of between 100 and 1000 Ohms, said resistor being in electrical communication between the pressure sensor and controller when said housing is coupled therebetween;
    wherein when said housing is coupled between the pressure sensor and the controller, said resistor alters the first signal to yield a third signal having a value based on the first signal, the third signal being transmitted to the controller in lieu of the first signal such that the second signal is generated based on the third signal.

2. An apparatus according to claim 1, wherein each of the first, second, and third signals have a value, and the first signal value is less than the third signal value when the transmission assembly is in use by a vehicle.

3. An apparatus according to claim 2, wherein the third signal value is equal to the first signal value when the first signal value is not zero and the transmission assembly is not in use by the vehicle.

4. An apparatus according to claim 3, wherein said signal values represent voltage levels.

5. An apparatus according to claim 2, wherein said pressure booster includes a plurality of wires each having different voltage potentials, and wherein said resistor is electronically coupled to the one of said plurality of wires with the highest voltage potential.

6. An apparatus according to claim 5, wherein said resistor has a resistance value of between about 200 Ohms and 500 Ohms.

7. An apparatus for increasing the fluid pressure within a transmission assembly, the transmission assembly including a transmission, a pressure sensor, and a controller, the pressure sensor in fluid communication with the transmission to sense pressure therein and deliver a signal indicative of sensed pressure to the controller, said apparatus consisting essentially of:
    a first part configured and dimensioned to be electrically coupled to said pressure sensor;
    a second part configured and dimensioned to be electrically coupled to the controller;
    a plurality of conductors communicating between said first part and said second part; and
    a voltage modifier having a resistance of at least 100 ohms disposed in series with only one of said plurality of conductors.

8. An apparatus according to claim 7, wherein said first and second parts are formed as separate housing members joined by said conductors.

9. An apparatus according to claim 7, wherein said first and second parts are formed as a unitary housing.

10. An apparatus according to claim 7, wherein the voltage modifier is a resistor.

11. A method for increasing the pressure of transmission fluid in a transmission, comprising:
    measuring a first pressure of transmission fluid in the transmission;
    generating a first signal indicative of the pressure;

modifying the first signal to a second signal indicative of a second pressure that is less than the first pressure when the transmission is in use by a vehicle; and increasing the first pressure based upon the second signal.

12. A method according to claim 11, wherein:
the transmission comprises a part of a transmission system also including a control valve, pressure sensor and controller;
said measuring and generating are done by the pressure sensor;
the modified, second signal is received by the controller and said increasing is in response to a third, pressure increasing signal delivered to the control valve by the controller.

13. A method according to claim 12, wherein the transmission system is an original equipment, closed loop transmission system.

14. A method according to claim 11, wherein said modifying comprises providing a pressure booster including a resistor having a resistance of at least 100 Ohms and sending the first signal to the pressure booster.

15. A method according to claim 11, wherein said modifying is about zero when the transmission is not in use by a vehicle.

16. A method according to claim 11, wherein said increasing increases at about constant rate at different values of the second signal when the transmission is in use by a vehicle.

17. A method according to claim 11, wherein said increasing increases the first pressure by about 10 to 15 psi.

18. A method according to claim 11, wherein said increasing increases the first pressure by about 20 to 30 psi.

19. A transmission system installed in a vehicle, the transmission system comprising:
a transmission;
a pressure sensor in communication with a pressurized fluid residing inside said transmission and generating a first signal indicative of a first pressure of said pressurized fluid in said transmission;
a pressure booster coupled to said pressure sensor and generating a second signal indicative of a second pressure from said first signal, wherein said second signal, when said transmission is in use by the vehicle, is less than said first signal, and wherein said second signal, when the vehicle is not being operated, is about the same as said first signal; and
a controller in electronic communication with said pressure booster for receiving said second signal.

20. A transmission system according to claim 19, wherein said pressure booster includes a housing sized and configured to couple to said pressure sensor and said controller, and wherein said pressure booster further includes a plurality of wires and a voltage modifier disposed within said housing, said voltage modifier electronically coupled to one of said plurality of wires.

21. A transmission system according to claim 20, wherein said plurality of wires are three wires having three different voltage potentials, and wherein said voltage modifier is electronically coupled the one of said three wires with the highest voltage potential.

22. A transmission system according to claim 21, wherein said voltage modifier is a resistor.

23. A transmission system according to claim 22, wherein said resistor has a resistance value of less than 2000 Ohms.

24. A transmission system according to claim 23, wherein said resistor has a resistance value of between about 100 Ohms and 500 Ohms.

25. A transmission system according to claim 22, wherein a difference between said first signal and said second signal increases proportionally to an increase in said first pressure, and wherein said controller communicates an increase in said first pressure by a constant amount.

26. A transmission system according to claim 25, wherein said constant amount is either 10 to 15 psi or 20 to 30 psi.

27. A pressure booster for electronically increasing the fluid pressure in a transmission system, the transmission system including a pressure sensor configured to generate a first signal indicative of an actual pressure within the system, a controller configured to receive the first signal and generate a second, control signal based thereon, and a valve configured to control fluid pressure in the system based upon the second, control signal received from the controller, the pressure booster comprising:
at least one member configured and dimensioned to be electronically coupled between the pressure sensor and the controller;
a plurality of conductors disposed within said at least one member, each said conductor providing electrical communication between corresponding conductors of said pressure sensor and controller; and
a resistor disposed in series with one of said conductors, the resistor having a resistance sufficient modify said first signal received by the controller to be indicative of a pressure lower than actual pressure such that the controller generates a second, control signal indicative of a higher pressure requirement.

28. The pressure booster of claim 27, wherein the resistor has a resistance value of between about 100 and about 1000 Ohms.

29. The pressure booster of claim 27, wherein the resistor has a resistance selected to modify the first signal to be indicative of a pressure from about 10 psi to about 30 psi lower than the actual pressure.

30. The pressure booster of claim 29, wherein the resistor has a value of about 200 to about 400 ohms.

31. The pressure booster of claim 29, wherein the resistor has a value of about 200 ohms to modify the first signal to be indicative of a pressure of about 10 psi to about 15 psi lower than the actual pressure.

32. The pressure booster of claim 29, wherein said resistor has a value of about 390 ohms to modify the first signal to be indicative of a pressure of about 20 psi to about 30 psi lower than the actual pressure.

33. The pressure booster of claim 27, wherein said at least one member comprises a first connector configured to be electrically connected to a connector in electrical communication with the pressure sensor and a second connector configured to be connected to a connector in electrical communication with the controller, and said plurality of conductors comprise wires extending between said first and second connectors.

\* \* \* \* \*

UNITED STATES PATENT AND TRADEMARK OFFICE
CERTIFICATE OF CORRECTION

| | |
|---|---|
| PATENT NO. | : 8,275,530 B2 |
| APPLICATION NO. | : 12/886062 |
| DATED | : September 25, 2012 |
| INVENTOR(S) | : Gregg A. Nader |

It is certified that error appears in the above-identified patent and that said Letters Patent is hereby corrected as shown below:

In column 8, claim 27, line 30, insert -- to -- between the words "sufficient" and "modify".

Signed and Sealed this
Nineteenth Day of February, 2013

Teresa Stanek Rea
*Acting Director of the United States Patent and Trademark Office*